A. HELFENSTEIN.
METHOD OF UTILIZING THE GASES RESULTING FROM REDUCTION OPERATIONS CARRIED OUT IN ELECTRIC FURNACES, AND ELECTRIC FURNACES FOR CARRYING OUT THE SAME.
APPLICATION FILED NOV. 16, 1909. RENEWED JULY 25, 1911.
1,002,988.
Patented Sept. 12, 1911.
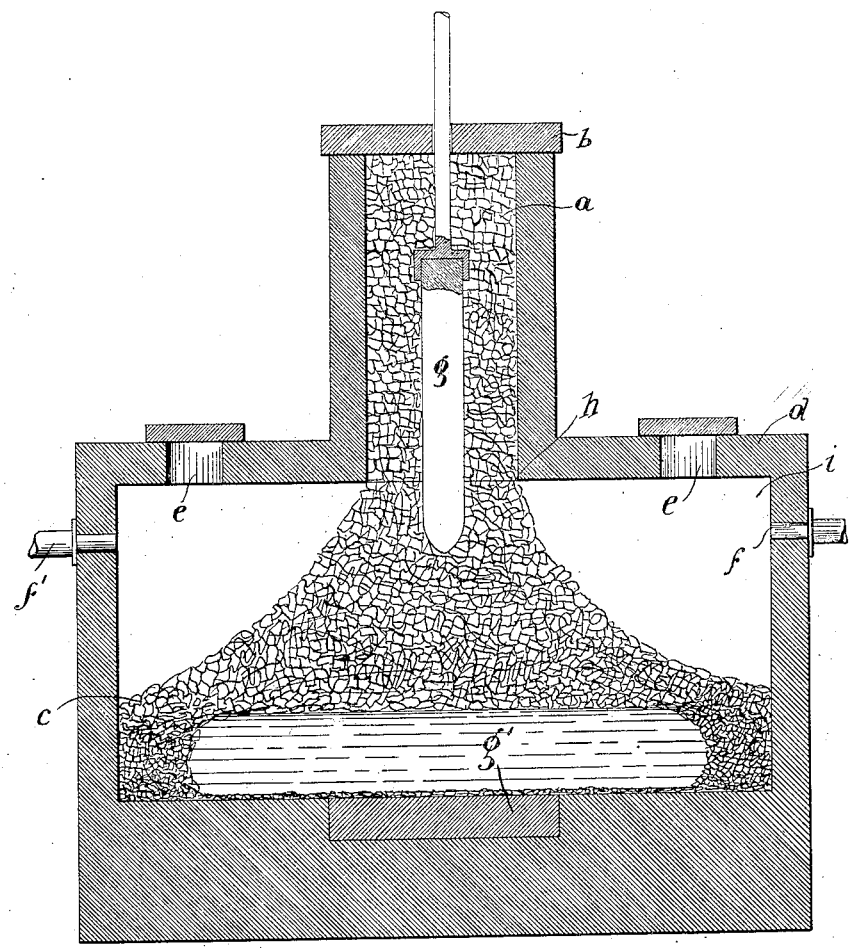

UNITED STATES PATENT OFFICE.

ALOIS HELFENSTEIN, OF VIENNA, AUSTRIA-HUNGARY.

METHOD OF UTILIZING THE GASES RESULTING FROM REDUCTION OPERATIONS CARRIED OUT IN ELECTRIC FURNACES, AND ELECTRIC FURNACES FOR CARRYING OUT THE SAME.

1,002,988.     Specification of Letters Patent.     Patented Sept. 12, 1911.

Application filed November 16, 1909. Serial No. 528,361. Renewed July 25, 1911. Serial No. 640,529.

*To all whom it may concern:*

Be it known that I, ALOIS HELFENSTEIN, a citizen of the Republic of Switzerland, residing at No. 4 Pokornigasse XIX, Vienna, in the Empire of Austria-Hungary, have invented certain new and useful improvements in methods of utilizing the gases resulting from reduction operations carried out in electric furnaces, and electric furnaces for carrying out the same, of which the following is a specification.

Various attempts have been made to utilize the large quantities of combustible gases which are generated during reduction processes in electric furnaces. These gases are burned in the mixture or in a special constituent of the mixture in the furnace itself or in the charging shaft, in order to preliminarily heat the mixing material, and finally, the gases are drawn off by suction and conveyed away for the purpose of being used elsewhere and not directly for the furnace process. This manner of consuming the generated gases is however attended with disadvantages, among which, is the fact that the air cannot be conveyed so that there is not from time to time a combustion of the carbon, which is intended for reduction purposes only, and thus interfering with the furnace process.

The object of the present invention is to obviate these disadvantages, and to provide a method and apparatus for carrying out said method, whereby the generated gases are consumed outside of the furnace charge, but within the furnace reduction chamber.

To this end the invention further consists in providing a free portion of the reduction chamber, limited by the sides of the furnace and by the inclined sides of the charge of material, in which space the gases are burned.

In carrying out the method forming the present invention, lime and coal, for example, (when it is desired to produce calcium carbid) are introduced into a charging shaft around the vertical electrodes arranged in said charging shaft, said charging shaft being of relatively small diameter or cross section and arranged above a reduction chamber of relatively larger dimensions. The mixture fed into the upper chamber or charging shaft at first passes into the lower or reduction chamber, where it spreads out in said enlarged reduction chamber so as to form an approximately conical shaped charge, whereby a large space is formed between the inclined sides of said conical shaped charge and the sides of the furnace, affording a combustion chamber for the gases generated during the reduction process. The relatively narrow charging shaft, which as above mentioned receives the electrode, is made gas-tight at its upper portion, so that gases generated during the reduction of the mixture surrounding the electrode are made to pass into the combustion space located in the reduction chamber.

A feature of my invention consists in that, when the material is charged into the charging shaft and reduction chamber, it is fed in such a quantity that the material fills, or nearly fills, said charging shaft, so as to completely inclose and surround the electrode. Into the combustion space of the reduction chamber, air is blown or otherwise suitably drawn, whereby the gases generated during the reduction process may be consumed, and the material constituting the mixture to be reduced may be preliminarily and suitably heated immediately before entering the melting zone. This preliminary heating of the material is effected by its direct contact with the flames produced by the combustion of the gaseous mixture, and by radiated heat. The products of combustion may be drawn off from the combustion chamber sidewise or upwardly, and conveyed away for the purposes of future use.

My invention may be carried out by means of the apparatus shown in vertical section in the accompanying drawing.

In the electric furnace shown in said drawing, the reference character *a* represents the charging shaft, which may be of cylindrical shape, or square shape, and is of relatively small diameter compared to the reduction chamber hereinafter described. The charging shaft *a* is provided with a gas-tight cover *b* on its upper portion, and at its lower end opens into the furnace reduction chamber *c*. The said reduction chamber may be of either cylindrical or square shape, and may be approximately rectangular in cross section and it is relatively large as compared with the charging shaft, as will be seen upon reference to the drawing. The reduction chamber is provided at its top with a fire-proof, gas-tight covering, d, in which are formed the openings or slots e. For the purpose of admitting the air used for the combustion of the gases generated during the melting of a charge, an opening f is provided in one of the side walls of the reduction chamber, so that the air may be blown or drawn directly into the combustion space for the gases. As before stated the products of combustion may be withdrawn from the chamber either sidewise or upwardly, but in the drawing I have shown a pipe f' disposed in one of the side walls of the furnace by means of which the said products of combustion may pass away. In the middle of the charging shaft is arranged an upper vertical electrode g while a lower electrode g' is arranged in the bottom wall of the furnace, said electrode being disposed preferably in a horizontal position as shown. The charge is effected in such a manner that the electrode g is surrounded by the mixture to be reduced.

It will thus be seen from the structural arrangement shown in the drawing that a cylindrical shaped charge contained in the charging shaft and surrounding the electrode g is connected directly at zone h with an approximately conical shaped charge contained in the reduction chamber c, the structure being such that the material fed into the reduction chamber assumes such approximately conical shape and provides a space between the inclined sides of the conical charge and the walls of the reduction chamber, said space serving as a combustion chamber i into which the gases generated during the reduction process are forced out of the mixture, and where they are burned by the introduction of a supply of air. This space i is thus brought to a white heat and the mixture continuously fed down from the charging shaft is preliminarily heated in this zone immediately after its entrance into the reduction chamber. The conveyance of the mixture out of the narrower shaft is promoted by the upward and downward movement of the electrode when the regulating thereof is effected. The electrode is always kept covered or surrounded by the material and thus protected from damage against the hot gases.

Besides the furnace gases, combustible gases from outside sources may be introduced into the space i through the openings f for the purpose of promoting the combustion, and to what extent this is necessary may be determined by observing the reduction process, which is made possible by means of the slots e. These slots also enable air to be introduced into the previously heated combustion chamber in carrying out the present method. The charging shaft may be narrowed at the bottom in order to reduce the upper cross section of the conical shaped charge of material.

I claim:—

1. The herein described method of utilizing the gases resulting from reduction operations carried out in electric furnaces, which consists in introducing a charge of material into the furnace in such a manner that the charge assumes an approximately conical shape and at the same time protecting and surrounding the upper electrode of the furnace by means of freshly fed material, and providing a space about the conical shaped charge into which gases generated during the reaction are discharged, melting the said charge of material and allowing the generated gases to discharge into the said space, and admitting air into said space so that it may mingle with the said gases and cause their combustion, whereby the material freshly fed into the electric furnace may be preliminarily heated in the upper zones of the conical shaped charge of material.

2. The herein described method of utilizing the gases resulting from reduction operations carried out in electric furnaces, which consists in introducing a charge of material into the furnace in such a manner that the charge assumes an approximately conical shape and at the same time protecting and surrounding the upper electrode of the furnace by means of freshly fed material, and providing a space about the conical shaped charge into which gases generated during the reaction are discharged, melting the said charge of material and allowing the generated gases to discharge into the said space, and admitting air and combustible gases into said space so that the air may mingle with the said gases and cause their combustion, whereby the material freshly fed into the electric furnace may be preliminarily heated in the upper zones of the conical shaped charge of material.

3. An electric furnace having a reduction chamber of relatively large diameter, and a charging shaft of relatively small diameter opening into said reduction chamber, a vertical electrode arranged within said charging shaft, and air inlet openings arranged to deliver air into said reduction chamber.

4. An electric furnace having a reduction chamber of relatively large diameter and a charging shaft arranged centrally of, and above said reduction chamber and opening thereinto, said charging shaft having a relatively small diameter as compared with said reduction chamber, a vertical electrode passing through said charging shaft, the arrangement being such that a charge of material into the furnace may surround the said electrode and may assume an approximately conical shape in the reduction chamber so that a combustion space for gases may be formed within the reduction chamber between the sides of the conical shaped charge and the walls of the reduction chamber, and air inlet openings arranged to deliver air into the interior of said reduction chamber.

5. An electric furnace having a reduction chamber of relatively large diameter and a charging shaft arranged above said reduction chamber and opening thereinto, said charging shaft having a relatively small diameter as compared with said reduction chamber, a vertical electrode passing through said charging shaft, a gas-tight cover for the upper portion of said charging shaft, the arrangement being such that a charge of material into the furnace may surround the said electrode and may assume an approximately conical shape in the reduction chamber so that a combustion space for gases may be formed within the reduction chamber between the sides of the conical shaped charge and the walls of the reduction chamber, and air inlet openings arranged to deliver air into the interior of said reduction chamber.

In testimony whereof I affix my signature in presence of two witnesses.

ALOIS HELFENSTEIN.

Witnesses:
JYSGNEZ KNOR SELMACHLE,
AUGUST FUGGER.

---

Copies of this patent may be obtained for five cents each, by addressing the "Commissioner of Patents, Washington, D. C."